United States Patent [19]

Leclaire

[11] Patent Number: 5,357,024

[45] Date of Patent: Oct. 18, 1994

[54] METHOD FOR PREPARING A POLYSILOXANE AND TITANATE COMPOSITION FOR HIGH REFRACTIVE INDEX COATINGS

[75] Inventor: Yves Leclaire, Paris, France

[73] Assignee: Essilor International, Creteil, France

[21] Appl. No.: 92,922

[22] Filed: Jul. 19, 1993

Related U.S. Application Data

[63] Continuation of Ser. No. 604,485, Oct. 29, 1990, abandoned.

[30] Foreign Application Priority Data

Oct. 30, 1989 [FR] France ............... 89 14224

[51] Int. Cl.⁵ .................................... C08G 77/06
[52] U.S. Cl. ......................... 528/39; 528/40; 528/25; 528/26; 106/287.19; 106/287.16; 428/447
[58] Field of Search ............ 528/25, 39, 17, 40, 528/26; 106/287.19, 287.16; 428/447

[56] References Cited

U.S. PATENT DOCUMENTS

| | | |
|---|---|---|
| 3,395,036 | 7/1968 | Campbell ............... 117/126 |
| 4,042,749 | 8/1977 | Sanduig ................ 428/412 |
| 4,070,343 | 1/1978 | Kishimoto et al. ..... 528/25 |
| 4,073,967 | 2/1978 | Sanduig ................ 427/44 |
| 4,084,021 | 4/1978 | Sanduig ................ 427/44 |
| 4,394,177 | 7/1983 | Fujioka et al. ........ 106/287.14 |
| 4,546,018 | 10/1985 | Ryuzo et al. ........ 528/27 |
| 4,731,264 | 3/1988 | Lin et al. ............. 427/387 |
| 4,741,931 | 5/1988 | Lin et al. ............. 528/17 |
| 4,746,366 | 5/1988 | Phillip et al. ........ 106/287.19 |
| 4,749,741 | 6/1988 | Saito et al. .......... 528/17 |
| 4,753,827 | 6/1988 | Yoldas et al. ........ 528/25 |
| 4,754,012 | 6/1988 | Yoldas et al. ........ 528/10 |
| 4,799,963 | 1/1989 | Basil et al. .......... 106/287.13 |
| 4,814,017 | 3/1989 | Yoldas et al. ........ 106/287.12 |

*Primary Examiner*—John C. Bleutge
*Assistant Examiner*—Margaret W. Glass
*Attorney, Agent, or Firm*—Millen, White, Zelano & Branigan

[57] ABSTRACT

A method of preparation of a polysiloxane resin composition for an antiabrasion coating having a high refractive index involves hydrolysis of a first constituent of the organosiloxane type to an alkoxysilane hydrolyzate containing condensable silanol groups, and reaction of the hydrolyzate obtained with a second constituent formed of an organic compound of titanium having at least one titanium ester function of carboxylic acid, with addition of a quantity of water such as to cause hydrolysis of the hydrolyzable groups which remain in the mixture obtained and formation of a siloxane prepolymer which integrates the titanium.

26 Claims, No Drawings

METHOD FOR PREPARING A POLYSILOXANE AND TITANATE COMPOSITION FOR HIGH REFRACTIVE INDEX COATINGS

This application is a continuation, of application Ser. No. 07/604,485, filed Oct. 29, 1990, now abandoned.

BACKGROUND OF THE INVENTION

1. Field of the Invention

The present invention relates to coating techniques as applied in particular to the protection of the so-called organic glasses which are made of plastic.

More specifically, the invention is concerned with a method of preparation of a coating composition based on polysiloxane resin an extends to the use of the composition obtained as a varnish for the antiabrasion protection of polycarbonate substrates. The essential aim of the invention is to increase the refractive index of varnishes of this type and accordingly finds a preferred field of application in ophthalmic optics.

Nevertheless, the invention is not limited to this particular application or to the protection of polycarbonates. It may also prove useful in all cases, for example, in which a transparent substrate requires a varnish having a high refractive index.

2. Description of the Prior Art

Plastics in general, and more especially those employed in the manufacture of ophthalmic lenses, usually have poor mechanical surface characteristics with in particular low resistance to abrasion and not-negligible sensitivity to aggressive solvents. It is therefore a common practice to protect them with an antiabrasion coating. Materials based on polycarbonates do not escape from this requirement. At the same time, it is known that the advantage offered by the use of polycarbonates in the manufacture of ophthalmic lenses lies mainly in the high refractive index which they make it possible to obtain with values of the order of 1.5 to 1.6, for example. But, it becomes difficult in this case to protect them with a suitable coating having a refractive index which must be sufficiently close to that of the lenses to avoid giving rise to interference phenomena which would impair the attractiveness of their appearance and their optical qualities.

In point of fact, the coating compositions employed up to the present time in this field produce maximum refractive indices of the order of 1.49 to 1.50. These compositions are usually based on polymerizable organic silanes and colloidal silica, and they are contemplated in particular for coating substrates of polycarbonate of bis-allyl diethylene-glycol. The preparation of these compositions as described for example in U.S. Pat. No. 3,986,997 involves a stage of hydrolysis of polyfunctional alkoxysilanes or epoxysilanes, thus giving rise to reactive silanol groups which condense and form polysiloxanes.

In order to improve these compositions, it has been proposed to introduce organic compounds of titanium and in particular titanium esters. Indeed it has been known for a long time (see French patent 1,473,183) that coating compositions may be improved through using the product from the reaction of an organic titanate, typically tetraisopropyl titanate with an epoxysilane such as GLYMO (glycéryloxypropyl tri-méthoxysilane). But, this solution involves considerable difficulties of preparation when using hydrolyzed alkoxysilanes, due to the reactivity of the titanates employed with respect to the organic silanes and to their tendency to undergo degradation in the presence of water and lead to the formation of tetravalent titanium hydroxide, which is insoluble.

French patent No. 2,446,308 proposes to hydrolyze completely an alkyl titanate in a water-alcohol mixture in order to obtain a salt of colloidal titanium dioxide which is then mixed with a hydrolyzate of silanes. The composition obtained is formed of colloidal silica and of colloidal titanium dioxide dispersed in a solution of siloxanol in a system of water-alcohol co-solvents. The disadvantage of such a method lies in the relative instability exhibited by titanium dioxide sols when they are added to the hydrolyzates of silanes, with the result that, as the concentration of titanium dioxide increases, so it becomes more difficult to obtain a satisfactory dispersion of the particles of titanium dioxide in the final composition without formation of precipitate.

Moreover, German patent No. 3,407,087 describes the preparation of a varnish from a mixture of alkoxysilanes and of derivatives of titanium such as ethyl titanate and isopropyl titanate. Hydrolysis of this mixture is effected in a two-step process. There is first carried out a precondensation in the presence of a quantity of water which is smaller than that required for stoichiometric hydrolysis of the hydrolyzable groups which are present. There is then carried out a complementary condensation with a quantity of water at least equal to that which corresponds to stoichiometric hydrolysis of the remaining hydrolyzable groups. This technique results in the formation of precipitates during preparation of the coating composition. This entails the need for filtrations and consequently causes losses of materials, with the result that the characteristics of the coating thus obtained are uncertain.

European patent Application No. 0263428 describes a similar technique by explaining at greater length the condensation and prepolymerization reactions which take place when preparing an alkoxysilane hydrolyzate which is partially hydrolyzed so that it still contains active silanol groups, to which is then added an alkyl titanate such as tetraethoxy-titanium, before adding water until complete hydrolysis of the hydrolyzable groups, there being thus obtained a coating composition which is hardenable by means of complementary condensation reactions within the prepolymer contained therein.

Experience shows that, here again, the precautions to be taken in order to avoid the formation of precipitates of titanium dioxide $TiO_2$ resulting from hydrolysis of alkoxysilane are incompatible with the practice of industrial manufacture and that, in addition, it is impossible to obtain a coating composition which has a sufficiently long "pot life" or stability in time prior to application on a substrate.

And in each of the methods disclosed in the prior art, it has proved impossible to prepare useful coating compositions with the concentrations of titanium dioxide which would have been necessary in order to increase the refractive index of the final varnish in a desirable manner.

In order to solve these difficulties, the invention proposes to employ special organic compounds of titanium consisting of titanium esters of carboxylic acids, i.e. acyl titanates, and to use them instead of the titanates of the prior art while avoiding their hydrolysis prior to reaction with the organic silane.

SUMMARY OF THE INVENTION

The invention is therefore primarily directed to a method of preparation of a polysiloxane resin composition for an antiabrasion coating having a high refractive index, which essentially involves hydrolysis of a first constituent of the organosilane type to a hydrolyzate of alkoxysilane having condensable silanol groups and reaction of the hydrolyzate obtained with a second constituent formed of an organic compound of titanium having at least one titanium ester function of carboxylic acid with addition of a quantity of water such as to cause hydrolysis of the hydrolyzable groups which remain in the mixture obtained and formation of a siloxane prepolymer which integrates the titanium.

DETAILED DESCRIPTION OF THE INVENTION

As will in any case be self-evident, the concept of organic titanate having at least one titanium ester function of carboxylic acid is understood here to designate the organic compounds of titanium constituted by an at least monofunctional acyl titanate or acyloxytitanium.

Preference is given to the use of mono-, di- or tri-functional acyl titanates. Accordingly, these compounds advantageously correspond to the following formula (I), the titanium being tetravalent:

$$(RCOO)_n TiR'_{(4-n)} \quad (I)$$

where:
n can assume any one of the values 1 to 4 and preferably the value 1, 2 or 3,
R is an atom of hydrogen or an alkyl radical with a preference among the alkyl radicals for those which contain 1 to 5 carbon atoms,
and R' is a hydrogen atom, a hydroxy group, or an alkoxy radical, which preferably contains 1 to 5 carbon atoms.

In preferred modes of execution, it is possible to employ in particular a formic titanate (where R is H) or an acetic titanate (where R is -CH$_3$).

To give examples of acyloxytitanium compounds, one can therefore mention the acetoxytitanium compounds, in particular CH$_3$COOTiR'$_3$, (CH$_3$COO)$_2$TiR$_2$' (CH$_3$COO)$_3$TiR', (CH$_3$COO)$_4$Ti, where R' has the meaning already stated in the case of formula (I).

In practice, preference will be given to the use of compounds of the acetoxyalkoxytitanium type corresponding to formula (I) in which R is CH$_3$ and R' is an alkoxy radical, preferably containing 1 to 5 carbon atoms. These compounds include in particular the trifunctional isopropyl acetoxy-titanate having the formula CH$_3$COOTi(O—iC$_3$H$_7$)$_3$. Other particularly advantageous compounds are those corresponding to the formula HCOOTiR'$_3$, in particular to HCOOTi(O—iC$_3$H$_7$)$_3$.

In accordance with a secondary feature of the method of the present invention, the acyloxytitanium compounds (I) can be obtained from tetra-alkoxytitanium compounds in which acyloxy functions are substituted for the alkoxy functions. This preparation is carried out without any water being present by reaction of a tetra-alkoxytitanium or tetra-alkyl titanate having the formula Ti(R')$_4$ in which the radicals R' can assume identical or different values, all selected from those indicated earlier in the case of formula (I) with a carboxylic acid RCOOH, where R has any one of the meanings already indicated.

The proportion of acid employed for this reaction is advantageously determined as a function of the number of alkoxy functions which it is sought to substitute, in the proportions of 1 to 4 acid equivalents for 1 equivalent of tetra-alkoxytitanium. The reaction is preferably carried out in the presence of a suitable non-aqueous solvent such as an alcohol, for example isopropanol.

The organic compound of titanium thus obtained may if desired be isolated from the reaction medium of its preparation, especially in the case of an acyloxytitanium, and more particularly of an acetoxytrialkoxytitanium compound such as isopropyl acetoxy-titanate. But it can also be kept in solution in said reaction medium so as to be subsequently employed directly in this anhydrous form until it is mixed with the hydrolyzate of alkoxysilane.

The preparation of the hydrolyzate of silanes is carried out in a conventional manner, starting from the compounds and mixtures of alkoxysilanes contemplated in the documents of the prior art, the hydrolysis of which is preferably carried out so as to ensure that practically the entire quantity of water introduced is consumed in the reaction of hydrolysis of the alkoxy radicals.

However, it has appeared advantageous in accordance with another characteristic feature of the invention to employ a mixture of silanes containing at least one epoxidized alkoxysilane and at least one non-epixidized alkoxysilane in relative proportions which are preferably within the range of ⅓ and 3/1 by weight.

The epoxidized organo-alkoxysilanes employed in the field of the present invention advantageously have the following formula (II):

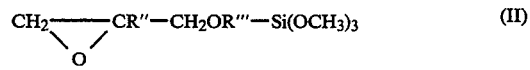
$$CH_2\underset{O}{\overset{}{\diagdown\diagup}}CR''-CH_2OR'''-Si(OCH_3)_3 \quad (II)$$

in which
R'' is a hydrogen atom or an alkyl radical containing 1 or 2 carbon atoms,
R''' is an alkylene radical containing 1 to 4 carbon atoms.

Preference is given to the use of gammaglycidoxypropyltrimethoxysilane designated hereinafter as GLYMO. But it is also possible to employ other organofunctional alkoxysilanes having an epoxy function such as those described in the patents cited earlier without thereby departing from the scope of the present invention. In addition OCH$_3$ in the above formula may be replaced by any OR$^3$ radical wherein R$^3$ is an alkyl group with from 1 to 5 carbon atoms.

With regard to the non-epoxidized alkoxysilane, it advantageously corresponds to the following formula (III)

$$R^4{}_n Si(OR^2)_{4-n} \quad (III)$$

in which:
n can assume the values 0, 1, 2 or 3, and,
R$^4$ and R$^2$ are alkyl radicals having preferably 1 to 5 carbon atoms.

As alkoxysilanes of formula (III), preference is given to the use of methyltrimethoxysilane and/or tetraethoxysilane.

At the time of preparation of a composition in accordance with the present invention, hydrolysis of the alkoxysilanes is preferably carried out in the presence of a quantity of water which is substantially stoichiometric with respect to the number of groups which are hydrolyzable to silanol groups. These hydrolyzable groups are represented in particular by the radicals $OR^2$ and $OCH_3$ (or $OR^3$) in formulae II and III given above. Moreover, the hydrolysis reaction is advantageously allowed to proceed until the quantity of water which remains free becomes negligible. Such hydrolysis can last several hours, typically from 10 to 20 hours.

At this stage, the hydrolyzate of alkoxysilanes can contain other constituents which are conventional per se in polysiloxane varnishes and which are added to the alkoxysilanes before or after the hydrolysis operation. Such additives can consist in particular of colloidal silica or of another metallic oxide in dispersion in the hydrolyzate, advantageously in a proportion between 10 and 30% by weight of the weight of solid materials of the hydrolyzate (dry extract).

When the acyloxytitanium compounds, especially those of formula (I), are added to the above-mentioned hydrolyzate of alkoxysilanes which is practically free of water, it is found surprisingly that no precipitate is formed, while the titanium compound is integrated in the prepolymer network as this latter is being formed. Although it is not desired to give any explanation of the reaction phenomena which would be liable to imply a limitation, it may be supposed that there takes place partial hydrolysis of the acyloxytitanium which makes use of the water liberated by the polycondensation reactions between the silanol groups of the hydrolyzate and consequently copolymerization of the titanium compound with the chains of polysiloxanes which are being formed. Meanwhile, it is remarkable that the presence of a least one acyloxy group in the molecule of the titanium compound seems to lower its reactivity with respect to the polysiloxanic prepolymer compositions resulting from hydrolysis. In connection therewith, the total process of the invention is far more easier to implement than the prior process requiring that prior hydrolysis be partial (a third compared to stoichiometric according to European patent 263 428), and be controlled within a short time (from 10 to 15 minutes in practice). Prior hydrolysis according to the invention is supposed to involve the formation of polysiloxanic chains which admittedly the prior art meant to avoid.

In the execution of the invention, it will be preferable to allow the reactions between the hydrolyzate and the titanium compound to proceed to completion before furthering the prepolymerization of the mixture by means of a complementary addition of water.

There thus emerges a secondary feature of the method contemplated by the invention. In accordance with this feature, the organic compound of titanium is contacted with said hydrolyzate of silane when the latter is practically free of water and entirely hydrolyzed. There is subsequently added to the mixture obtained a quantity of water at least equal to that which is necessary for stoichiometric hydrolysis of the organic compound of titanium.

A point worthy of note is that, in the case of hydrolysis carried out after incorporation of the titanium compound, there is no objection to the use of considerably greater quantities of water than those corresponding to the stoichiometric requirement of the hydrolyzable functions which remain in the composition.

In order to facilitate this final reaction, which involves hydrolysis, condensation and polymerization, it is desirable to add to the composition of the invention a cross-linking agent for the epoxide groups which may be present in the hydrolyzate of silanes, especially in the case of a constituent corresponding to formula (II). This agent can be chosen in a manner known per se from those which facilitate opening of the epoxide groups. Consideration may be given in particular to a polycarboxylic acid or an equivalent derivative of this acid such as a polyfunctional anhydride or a polyfunctional imide. Itaconic acid is preferably employed as polycarboxylic acid.

The coating composition thus prepared in accordance with the invention preferably contains in addition a hardening catalyst which can be selected from those known for their action in compositions similar to those of the present invention. It is thus possible to use in particular acetylacetonates of metals, preferably of zinc, iron or cobalt, diamides, imidazoles, amines, organic sulphonic acids and their amine salts, alkali metal salts of carboxylic acid, cyclic amidines, in particular diaza-1,8 bicyclo [5.4.0] undecene-7, designated hereinafter as D.B.U.

Other additives may be added to the composition in accordance with the invention in order to improve the usefulness of the coatings. They may include, for example, surface-active agents, ultraviolet absorbers, antioxidants, and so on.

In accordance with a preferred form of execution of the invention for the purpose of obtaining a varnish having a particularly high refractive index, it is possible to apply the method defined above to the preparation of a composition having a high proportion of titanium, again without causing the least formation of precipitates, or even subsequently during storage of the product obtained. It is possible in particular to introduce the titanium compound into the hydrolyzate of silanes in a proportion corresponding to 20 to 30% by weight of $TiO_2$ with respect to the weight of solid materials of the final composition.

In consequence, the invention also has for its object a coating composition thus obtained as distinguished by the fact that it contains an organo-alkoxysilane hydrolyzate copolymerized with an organic compound of titanium, in the form of a stable aqueous sol in which the proportion of dry extract of titanium is at least equal to 20% by weight of $TiO_2$ with respect to the total weight of solid materials, and especially of the order of 25% to 30%, as well as the use of a composition of this type to form an antiabrasion coating on a substrate of transparent polycarbonate having a high refractive index which is in particular higher than 1.5.

All the compositions prepared in accordance with the invention can be presented so as to be preserved as in the case of the usual polysiloxane varnishes, to be applied on substrates and hardened in the same manner.

The invention will now be described in greater detail with reference to particular examples of execution which are not given in any sense by way of limitation.

EXAMPLES

Example 1

1) Preparation of the hydrolyzate of silanes

For this hydrolysis reaction, the quantity of water is stoichiometric.

79.2 g of an aqueous dispersion of colloidal silica containing 34% SiO$_2$ designated as Nalcoag 1034 A is mixed with 5 drops of concentrated HCl.

There are then added drop by drop, during a period of 40 minutes, without cooling, 73.06 g of methyltrimethoxysilane mixed with 101.85 g of glycidyloxypropyltrimethoxysilane (GLYMO).

At the time of hydrolysis, the temperature rises to 43.5° C.

The hydrolysis reaction is allowed to continue for approximately 15 hours, whereupon the titanium compound is prepared separately as follows:

2) Preparation of the organic compound of titanium 160.1 g of isopropyl titanate and 100 g of isopropanol are mixed without cooling with 33.7 g of acetic acid.

At the time of addition of acetic acid, the temperature rises to 64.5° C. Monoacetoxytriisopropyloxy-titanium is thus obtained.

3) Prepolymerization

Approximately 12 minutes after addition of acetic acid, the temperature has fallen to 50° C.

The hydrolyzate of silanes is then added drop by drop in the titanium compound. No precipitate is formed at the time of this addition.

The preparation is then diluted with isopropanol. After agitating for about 2 hours, there is then added the theoretical quantity of water which is necessary for stoichiometric hydrolysis of the titanate, that is to say 40.6 g of H$_2$O.

Here again, no precipitate is formed.

Prepolymerization is allowed to take place at room temperature for approximately 48 hours. There are then added 18.33 g of itaconic acid (which serves as crosslinking agent by opening of the epoxide groups of the GLYMO) as well as 12.85 g of diazabicyclo-undecene (DBU, which serves as thermal hardening catalyst).

The coating composition thus obtained is diluted to 15% of theoretical dry extract by addition of isopropanol.

0.15% of surfactant is then added in order to obtain a product which is ready for use.

4) Application

A glass of bisphenol A polycarbonate of the type known by the trade name Makrolon in which the monomer structure is 2,2bis(4 hydroxyphenyl)-propane is dipped in the above product, then subjected to a heat treatment for a period of 4 hours in an oven at 120° C.

The treatment ensures hardening of the film of varnish deposited at the surface of the glass. Glass which has been coated in this manner has very good resistance to abrasion. It can readily be colored in the usual coloring baths.

The refractive index of the thermohardened varnish is 1.57. Its thickness is of the order of 5 microns on an average.

Adhesion of the varnish to its support is very good before and after residence of the varnished glass in boiling water for a period of 1 hour (AFNOR T 30038 test modified for measurement of adhesion).

EXAMPLE 2

1) Preparation of the hydrolyzate of silanes

Again in the case of this hydrolysis reaction, the quantity of water is stoichiometric.

124.8 g of tetraethoxysilane and 139.9 g of GLYMO are mixed together.

A preparation consisting of 75.2 g of H$_2$O and 10 g of acetic acid is then added very rapidly and without cooling.

At the time of hydrolysis, the temperature rises to 43° C.

The hydrolysis reaction is allowed to continue for approximately 15 hours and the titanate is then prepared separately as follows:

2) Preparation of the organic compound of titanium 160.1 g of isopropyl titanate and 100 g of isopropanol are mixed without cooling with 33.7 g of acetic acid.

At the time of addition of acetic acid, the temperature rises to 60° C.

3) Prepolymerization

The temperature is allowed to fall to approximately 50° C., whereupon the hydrolyzate of silanes is added drop by drop in the titanate. No precipitate appears during this addition.

The preparation is diluted with 300 g of isopropanol, agitation being then continued for a period of approximately 2 hours before adding the quantity of water which is necessary for hydrolysis of the titanate, namely 40.6 q of H$_2$O, No precipitate is formed.

Prepolymerization is allowed to take place at room temperature for a period of approximately 48 hours. There are then added 18.33 g of itaconic acid as well as 12.85 g of DBU.

The composition obtained is diluted to 15% of theoretical dry extract by addition of isopropanol. 1.5% of surface-active agent is added in order to obtain a product which is ready for use.

4) Application

A polycarbonate glass is dipped in this preparation, then maintained in an oven during a period of 4 hours at 120° C. in order to harden the varnish.

After this treatment, said glass has very good resistance to abrasion, can be colored and the refractive index of the thermohardened coating is 1.568. Adhesion of the varnish is very good both before and after a residence period of 1 hour in boiling water.

Depending on the conditions of the dipping application and the dilution ratio of the composition, varnish thicknesses within the range of 2 to 8 microns are obtained.

Example 3

Results similar to those of the preceding examples are obtained by operating in the same manner but with constituents which are different in nature and in proportions:

Hydrolyzate of silanes
    243.6 g of methyltrimethoxysilane
    208 g of tetraethoxysilane
    381.6 g of GLYMO
    256 g of water
    51.2 g of acetic acid Organic compound of titanium
    133.4 g of isopropyl tetratitanate
    100 g of butanol
    28.2 g of acetic acid which results in the production of monoacetoxylated titanate Subsequent hydrolysis with 67.6 g of water corresponding to twice the stoichiometric quantity of hydrolysis of the titanate.

After the dipping application, baking of the varnish is continued over a period of 16 hours at 120° C.

Example 4

The operation is performed as in Example 3 but by doubling the quantity of acetic acid which reacts with the titanium tetraester in order to obtain the diacetoxylated titanate.

Example 5

The operation is the same as in Example 3 except for the fact that, in the preparation of the mono-acyloxy-trialkoxy-titanium (in which the alkoxy radical is the isopropyloxy radical), acetic acid is replaced by 21.6 g of formic acid.

In the three examples given in the foregoing, analysis of the dry extract shows the following composition by weight of solid materials:
Titanate: 25% $TiO_2$
Silica: 10% $SiO_2$
Silanes: 20% $CH_3SiO_{3/2}$
whereas the best examples of the documents of the prior art result only in 16% $TiO_2$.

The refractive index of the varnishes obtained in accordance with the invention after hardening is higher than 1.55 in all cases.

Naturally, the invention is not in any sense limited to the particular features specified in the foregoing examples or to the details of the particular modes of execution which have been chosen in order to illustrate the invention. All kinds of variants may be considered in regard to the operating conditions as well as the nature and proportions of the constituents and reagents without thereby departing from the scope of the invention.

It will be noted in particular that, in the majority of instances, it is possible to vary the proportions of the titanate between 20 and 30% of the weight of $TiO_2$ in the dry extract and those of the silanes between 10 and 40% by weight of $CH_3$-$SiO_{3/2}$ in the dry extract while retaining the advantages of the invention in regard to the absence of precipitation during execution of the method and the general qualities of the compositions and varnishes obtained such as the stability of viscosity of the compositions, their long pot life, the abrasion resistance of the hardened varnishes and their colorability.

What is claimed is:

1. A method for preparing a polysiloxane and titanate composition comprising a siloxane prepolymer incorporating titanium and suitable for producing high refractive index anti-abrasion coatings, said method comprising providing as a first constituent of said prepolymer a practically water-free hydrolyzate of an alkoxy silane having condensable silanol groups obtained by the hydrolysis of an organosilane with a stoichiometric quantity of water with respect to any groups in said organosilane which are hydrolyzable into silanol groups, providing as a second constituent of said prepolymer a carboxylic acid ester of titanium having the formula I $$(RCOO)_n TiR'_{(4-n)} \qquad (I)$$

wherein:
n is an integer of from 1 to 4 inclusive,

R is a hydrogen atomo or an alkyl group of 1-5 C atoms, and

R' is a hydrogen atom, a hydroxy group, or an alkoxy group of 1-5 C atoms; reacting said first and second constituents to completion to form said siloxane prepolymer incorporating the titanium in the absence of added water; and thereafter adding water to cause hydrolysis of any remaining hydrolyzable groups to further the prepolymerization, the proportions of reactants resulting in a stable aqueous sol containing from 20-30% by weight of $TiO_2$ with respect to the weight of solid materials of the final composition of said sol.

2. A process according to claim 1, wherein said first constituent contains an epoxide group, said process further comprising adding to the stable aqueous sol a crosslinking agent for the epoxide group.

3. A process according to claim 2, wherein said crosslinking agent is itaconic acid.

4. A process according to claim 3, further comprising adding a thermal hardening catalyst to the final composition, coating resultant composition on a transparent substrate, and subjecting the resultant coated substrate to heat treatment for a sufficient time to harden the resultant coating, thereby obtaining a thermal-hardened coating having a refractive index of at least 1.5.

5. An article of manufacture produced by the process of claim 4.

6. An article according to claim 5, wherein said transparent substrate is a polycarbonate.

7. A method according to claim 1, wherein said carboxylic acid ester of titanium is a formic or acetic titanate.

8. A method according to claim 1, wherein said carboxylic acid ester of titanium is an acetoxyalkoxy-titanium ester.

9. A method according to claim 8, wherein said carboxylic acid ester of titanium is monoacetoxytriisopropyloxytitanium.

10. A method according to claim 8, wherein said carboxylic acid ester is an acetoxytrialkoxy titanium ester.

11. A method according to claim 1, wherein said carboxylic acid ester of titanium is prepared by reacting in the absence of water, a titanate having the formula $Ti(R')_4$ with a carboxylic acid RCOOH, in a solvent medium in order to obtain a compound corresponding to formula I:

$$(RCOO)_n TiR'_{(4-n)} \qquad (I)$$

wherein:
n is an integer of from 1 to 4 inclusive,
R is a hydrogen atom or an alkyl group, and,
R' is a hydrogen atom, a hydroxy group or an alkoxy group.

12. A method according to claim 11, wherein said reacting is conducted in a non-aqueous alcohol solvent.

13. A method according to claim 1, wherein said hydrolyzate is prepared by hydrolysis of a mixture of organosilanes containing at least one epoxidized alkoxysilane and at least one non-epoxidized alkoxysilane.

14. A method according to claim 13, wherein said mixture of organosilanes comprises, in relative proportions in accordance with a ratio within the range of 3/1 and ⅓ by weight:
an epoxidized alkoxysilane having the formula:

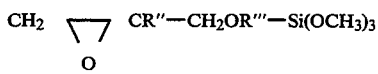 (II)

in which
R'' is a hydrogen atom or an alkyl radical containing 1 or 2 carbon atoms,
R''' is an alkylene radical containing 1 to 4 carbon atoms;
and a non-epoxidized alkoxysilane having the formula:

 (III)

in which:
n is 0, 1, 2 or 3, and
R$^4$ and R$^2$ are alkyl groups.

15. A process according to claim 14, wherein R$^4$ and R$^2$ are alkyl radicals containing 1–5 carbon atoms.

16. A method according to claim 14, wherein said epoxide alkoxysilane of formula II is gammaglycidoxypropyltrimethoxysilane and said non-epoxidized alkoxysilane of formula III is methyltrimethoxysilane or tetraethoxysilane.

17. A method according to claim 13, wherein said mixture of organosilanes comprises, in relative proportions in accordance with a ratio within the range of 3/1 and ⅓ by weight:
an epoxidized alkoxysilane having the formula:

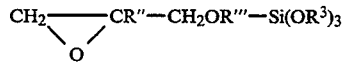 (II)

in which
R'' is hydrogen or an alkyl group having 1 or 2 carbon atoms,
R''' is an alkylene group having 1 to 4 carbon atoms,
R$^3$ is an alkyl group having 1–5 carbon atoms;
and a non-epoxidized alkoxysilane having the formula:

 (III)

in which
n is 0, 1, 2 or 3, and,
R$^4$ and R$^2$ are each alkyl groups.

18. A method according to claim 17, wherein R$^4$ and R$^2$ are each alkyl groups having 1–5 carbon atoms.

19. A method according to claim 1, wherein hydrolysis to obtain said hydrolyzate is conducted for 10 to 20 hours.

20. A polysiloxane and titanate composition suitable as an antiabrasion coating composition for high refractive index lenses, as produced in accordance with the method of claim 1.

21. An article of manufacture comprising a substrate of transparent polycarbonate having a refractive index higher than 1.5, and a composition according to claim 20 in the form of an antiabrasion coating supported by said substrate.

22. A method according to claim 1, further comprising adding itaconic acid as a cross-linking agent.

23. A method according to claim 1, wherein n is 1, 2 or 3.

24. A method according to claim 1, wherein before hydrolysis of said organosilane to form said hydroylzate, 10–30 wt. % of colloidal silica is added based on the weight of solid materials of said hydrolyzate as a dry extract.

25. A method according to claim 1, wherein after hydrolysis of said organosilane to form said hydrolyzate, 10–30 wt. % of colloidal silica is added into the weight of solid materials of said hydrolyzate as a dry extract.

26. A method for preparing a polysiloxane and titanate composition comprising a siloxane prepolymer incorporating titanium and suitable for producing high refractive index anti-abrasion coatings, said method comprising providing as a first constituent of said prepolymer a hydrolyzate of an alkoxy silane having condensable silanol groups obtained by the hydrolysis of an organosilane with a stoichiometric quantity of water with respect to any groups in said organosilane which are hydrolyzable into silanol groups, providing as a second constituent of said prepolymer a carboxylic acid ester of titanium having the formula I

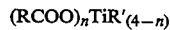 (I), wherein:
n is an integer of from 1 to 4 inclusive,
R is a hydrogen atoms or an alkyl group of 1–5 C atoms, and
R' is a hydrogen atom, a hydroxy group, or an alkoxy group of 1–5 C atoms; reacting said first and second constituents to completion to form said siloxane prepolymer incorporating the titanium in the absence of added water whereby no precipitate is formed; and thereafter adding water to cause hydrolysis of any remaining hydrolyzable groups to further the prepolymerization, the proportions of reactants resulting in a stable aqueous sol containing from 20–30% by weight of TiO$_2$ with respect to the weight of solid materials of the final composition of said sol.

* * * * *